(12) United States Patent
Schaller

(10) Patent No.: US 9,174,148 B2
(45) Date of Patent: Nov. 3, 2015

(54) LAUNDER CHANNEL COVER WITH INDEPENDENTLY OPENABLE PANEL MEMBERS

(71) Applicant: Earle Schaller, Palm Beach Gardens, FL (US)

(72) Inventor: Earle Schaller, Palm Beach Gardens, FL (US)

( * ) Notice: Subject to any disclaimer, the term of this patent is extended or adjusted under 35 U.S.C. 154(b) by 296 days.

(21) Appl. No.: 13/651,701

(22) Filed: Oct. 15, 2012

(65) Prior Publication Data

US 2013/0277301 A1    Oct. 24, 2013

Related U.S. Application Data

(60) Provisional application No. 61/547,981, filed on Oct. 17, 2011.

(51) Int. Cl.
| | | |
|---|---|---|
| *B01D 21/24* | (2006.01) | |
| *B65D 43/02* | (2006.01) | |
| *B65D 43/14* | (2006.01) | |
| *E04D 3/24* | (2006.01) | |
| *B01D 21/00* | (2006.01) | |

(52) U.S. Cl.
CPC ........ *B01D 21/0003* (2013.01); *B01D 21/2444* (2013.01); *B65D 43/02* (2013.01); *B65D 43/14* (2013.01)

(58) Field of Classification Search
CPC ........ B65D 43/00; B65D 43/02; B65D 43/14; B01D 21/0003; B01D 21/24; B01D 21/2427; B01D 21/2444; E04D 3/24; E04D 2001/3447

USPC ........ 220/213, 216, 516, 524, 810, 826; 52/5, 52/83, 579, 52, 88, 90.1, 588.1; 210/170.03, 188, 521, 528, 532.1, 210/538–541

See application file for complete search history.

(56) References Cited

U.S. PATENT DOCUMENTS

| | | | | | |
|---|---|---|---|---|---|
| 4,154,358 | A | * | 5/1979 | Nayler et al. | 220/222 |
| 4,189,058 | A | * | 2/1980 | Seliskar et al. | 220/218 |
| 5,965,023 | A | * | 10/1999 | Schaller | 210/540 |
| 6,216,881 | B1 | * | 4/2001 | Schaller | 210/540 |
| 6,676,723 | B2 | * | 1/2004 | Chwala | 55/421 |
| 7,208,080 | B2 | * | 4/2007 | Batten et al. | 210/86 |
| 7,473,358 | B1 | * | 1/2009 | Schaller | 210/232 |
| 7,556,157 | B2 | * | 7/2009 | Schaller et al. | 210/521 |
| 7,591,381 | B2 | * | 9/2009 | Schaller | 210/519 |
| 7,963,403 | B2 | * | 6/2011 | Schaller et al. | 210/521 |
| 7,971,731 | B2 | * | 7/2011 | Schaller | 210/521 |
| 2004/0016696 | A1 | * | 1/2004 | Schaller | 210/540 |
| 2010/0213120 | A1 | * | 8/2010 | Schaller et al. | 210/521 |

* cited by examiner

*Primary Examiner* — Joseph Drodge
(74) *Attorney, Agent, or Firm* — Sofer & Haroun, LLP

(57) ABSTRACT

A cover arrangement is provided for a launder channel of a clarifier tank. The cover arrangement includes at least one mounting section coupled to the clarifier tank near the launder channel. A plurality of cover panel members are provided, each panel member having a surface and two stiffening flanges located on opposing lateral edges of the surface, where each of the cover panel members further includes a light seal either one of attached to or attached near one of the stiffening flanges. The cover arrangement includes arranging the plurality of cover panels around the clarifier tank over the launder channel such that the light seal attached to or near the outer surface of the stiffening flange of a first panel member among the plurality of panel members abuts against a stiffening flange of an adjacent second panel member among the plurality of panel members.

11 Claims, 8 Drawing Sheets

PRIOR ART COVER OVER LAUNDER CHANNEL

PRIOR ART COVER LAYOUT

PRIOR ART "A" AND "B" COVER PANELS

PRIOR ART "A" "B" "A" COVER CONFIGURATION

PRIOR ART "A"-"B" ZIPPER COVER

"B"–"B" COVER GASKET

WEIR WALL MOUNT "B"-"B" COVER

TYPICAL TANK WALL MOUNT "B"-"B" COVER

LAUNDER CHANNEL COVER WITH INDEPENDENTLY OPENABLE PANEL MEMBERS

RELATED APPLICATION

This application claims the benefit of priority from U.S. Provisional Patent Application No. 61/547,981, filed on Oct. 17, 2011, the entirety of which is incorporated by reference.

BACKGROUND

1. Field of the Invention

This application relates to waste treatment tank covers. More particularly, the application relates to a cover for a launder channel with panel members.

2. Description of Related Art

In the field of wastewater treatment, clarifier tanks are used to separate solids from the water. Clarifier tanks typically receive influent water through a pipe located at or near the bottom of the tank, that then carries the water up through the center of the tank and discharges the water near the top of the tank. The solids in the influent water settle to the bottom of the tank with the clean water forced under a scum baffle, over a weir and into a launder channel mounted around the periphery of the tank.

A common problem in clarifier tanks is the buildup of algae and other contaminants on the surfaces of the scum baffle, the weir and the launder channel. Not only is the algae growth unsightly, it can affect the hydraulic performance of the clarifier, clog downstream filters, cause problems with UV (ultraviolet) disinfection equipment and generally become an expensive maintenance issue.

To correct this, in the prior art a cover is placed over the launder channel, the scum baffle and the weir to block sunlight from reaching these surfaces, thereby inhibiting the growth of the algae.

Prior art FIG. 1 shows an exemplary cover over a launder channel. Typically, these covers are comprised of numerous consecutive panel members installed over the launder channel around the entire circumference of the tank.

Prior art FIG. 2 shows a top view of a standard arrangement of three consecutive panels covering a portion of the launder channel of a clarifier tank. A common feature of these covers is a tab or extension added to the ends of certain panels that serve to cover the seam between individual panels to ensure that no light reaches the surfaces below.

One typical prior art cover arrangement has consecutive cover panel sections, where alternating panels have tabs to seal out sunlight. While they are effective, these tabs require that the cover panels roust be opened in a specific sequence in order that all of the panels can be opened.

For example, in prior art FIG. 3 a first "A" panel has tabs on either side of the panel. The adjacent cover panels are referred to as "B" panels and have no tabs, but may have stiffening flanges along the curved edges of the panel to keep the panel from sagging under the weight of the A panel that rests on the B panel. In this arrangement, the tabs on the A panel overlap the edges of the B panel to seal out the light.

A typical cover arrangement using "A" and "B" type panels is shown in prior art FIG. 4, with an A panel on either side of a B panel. To open the center B panel, it is first necessary to open the A panels on either side. This is sometimes referred to as an "A-B-A" cover (arrangement).

An alternative cover is shown in prior art FIG. 5. Here, each panel has an "A"-type tab at one end and a stiffening flange at the other.

The A end of the panel rests on the B end (stiffening flange only) of the adjacent panel. This allows the cover to be opened in only one direction. To open the cover, the operator stands in one place, for example, the bridge of the clarifier, opens one cover panel, enters the launder and proceeds to open the cover panel by panel going in one direction and then reversing himself to close the cover. This is often referred to as an "A-B Zipper" arrangement.

These prior art A-B-A and A-B Zipper arrangements are common whether the cover is mounted to the tank wall and the panels open back toward the outside of the clarifier, or when the cover is mounted to the weir wall of the clarifier and opens toward the center of the clarifier.

These prior art designs work well when the clarifier is located at ground level and plant personnel have ready and convenient access to the clarifier launder. However, a large number of clarifiers are elevated, or otherwise built in a configuration where access to the launder is neither safe nor convenient. Often, it is necessary to reach a specific cover panel to perform maintenance or find the source of a problem. There is a substantial effort involved in locating a particular area on the circumference of a two hundred foot diameter tank standing fifteen feet in the air, while maneuvering large ladders into position against the tank wall and opening three or snore cover panels to investigate a problem. Similarly, maintenance personnel may be required to open half the covers in a zipper cover arrangement, walking in the launder itself, to reach a trouble spot.

OBJECTS AND SUMMARY

The present arrangement provides a launder channel cover for a clarifier tank made of consecutively arranged panel members, where each member can be opened independent of all other panel members, while simultaneously sealing out light in the seam between any two panel sections and ensuring a continuous cover for the entire launder channel. The present application may refer to a cover arrangement using the present covers as a "B-B Cover." In the present arrangement, the cover panels can each be mounted to the tank wall or to the weir wall. This cover arrangement is adaptable to round tanks as well as multi-sided tanks.

To this end, the present arrangement is directed to a cover arrangement for a launder channel of a clarifier tank, the clarifier tank has a tank wall, a launder channel and a weir wall. The cover arrangement includes at least one mounting section coupled to the clarifier tank near the launder channel. A plurality of cover panel members are provided, each panel member having a surface and two stiffening flanges located on opposing lateral edges of the surface, where each of the cover panel members further includes a light seal either one of attached to or attached near one of the stiffening flanges.

The cover arrangement includes arranging the plurality of cover panels around the clarifier tank over the launder channel such that the light seal attached to or near the outer surface of the stiffening flange of a first panel member among the plurality of panel members abuts against a stiffening flange of an adjacent second panel member among the plurality of panel members.

BRIEF DESCRIPTION OF THE DRAWINGS

The present invention can be best understood through the following description and accompanying drawings, wherein.

DESCRIPTION

Figure 1:
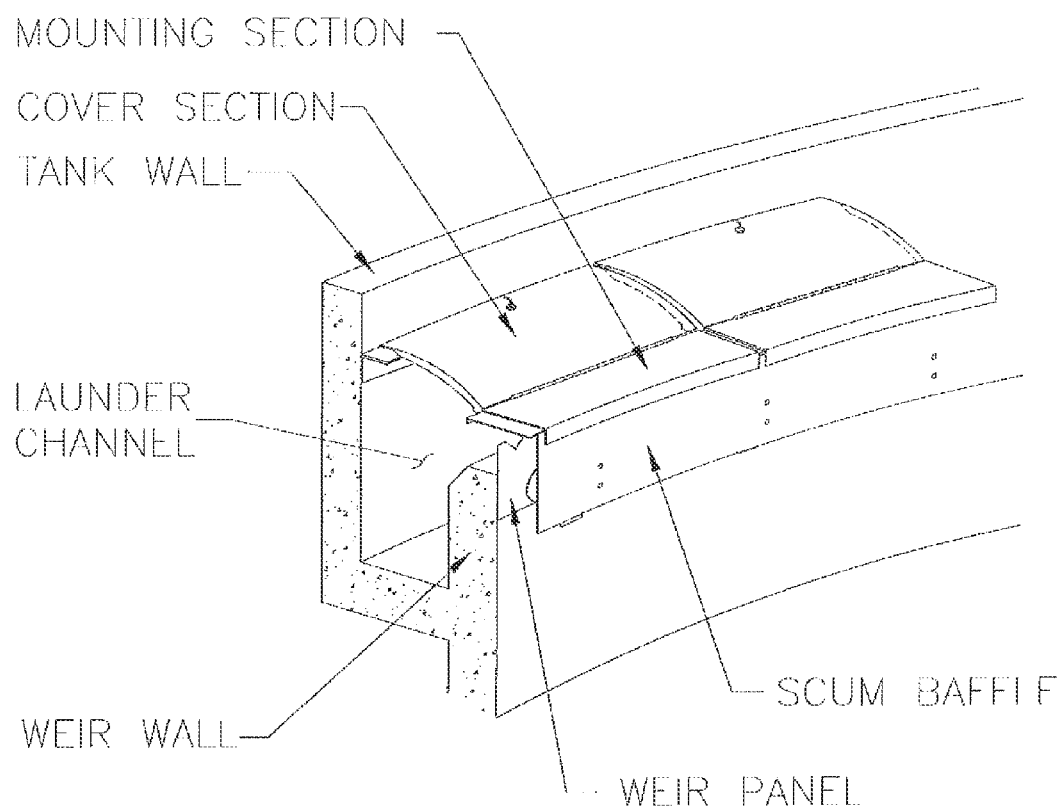
FIG. 1 is a prior art side view of a clarify tank and launder channel with a cover.
Figure 2:
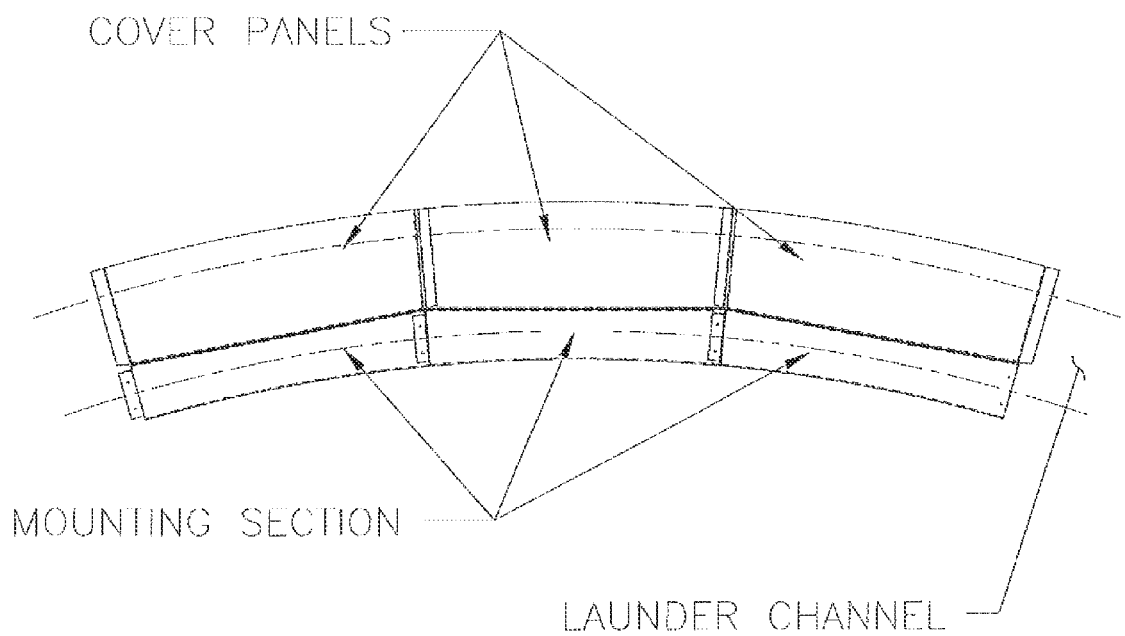
FIG. 2 is a prior art top view of the cover panels of the cover of FIG. 1.
Figure 3:
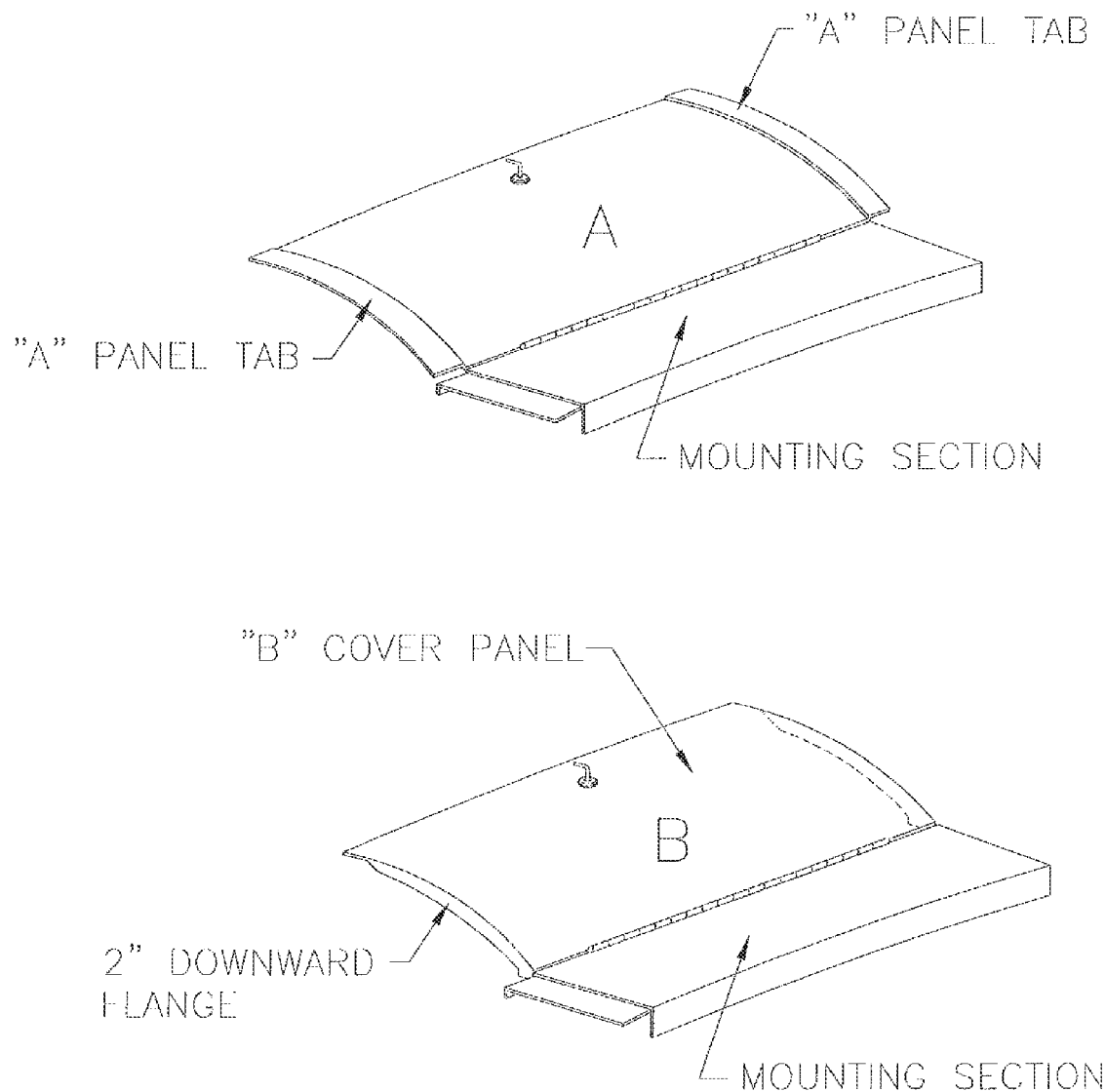
FIG. 3 is a prior art view of two prior art cover panels.
Figure 4:
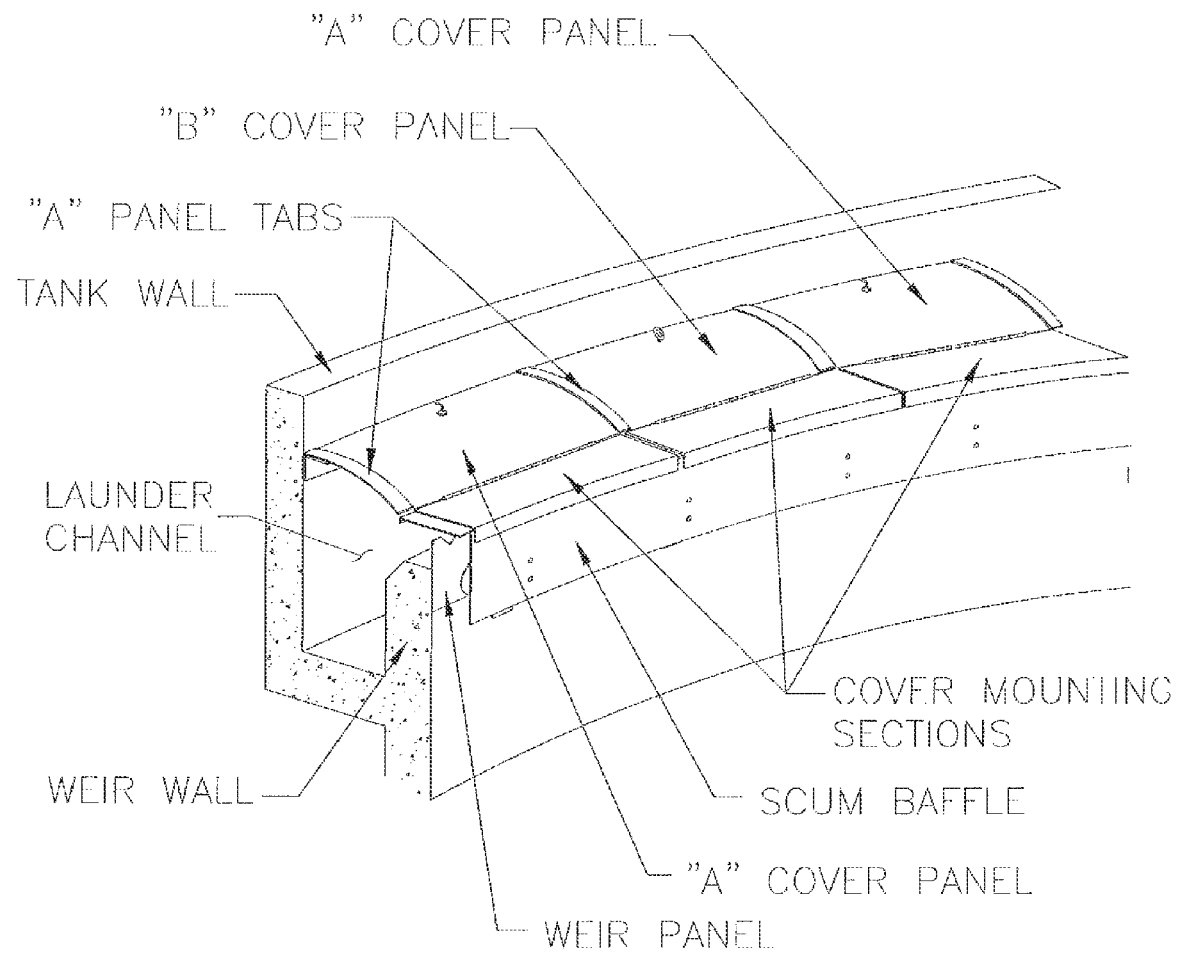
FIG. 4 is a prior art view showing the cover panels of FIG. 3 in the arrangement of FIG. 1 in an "A-B-A" arrangement.
Figure 5:
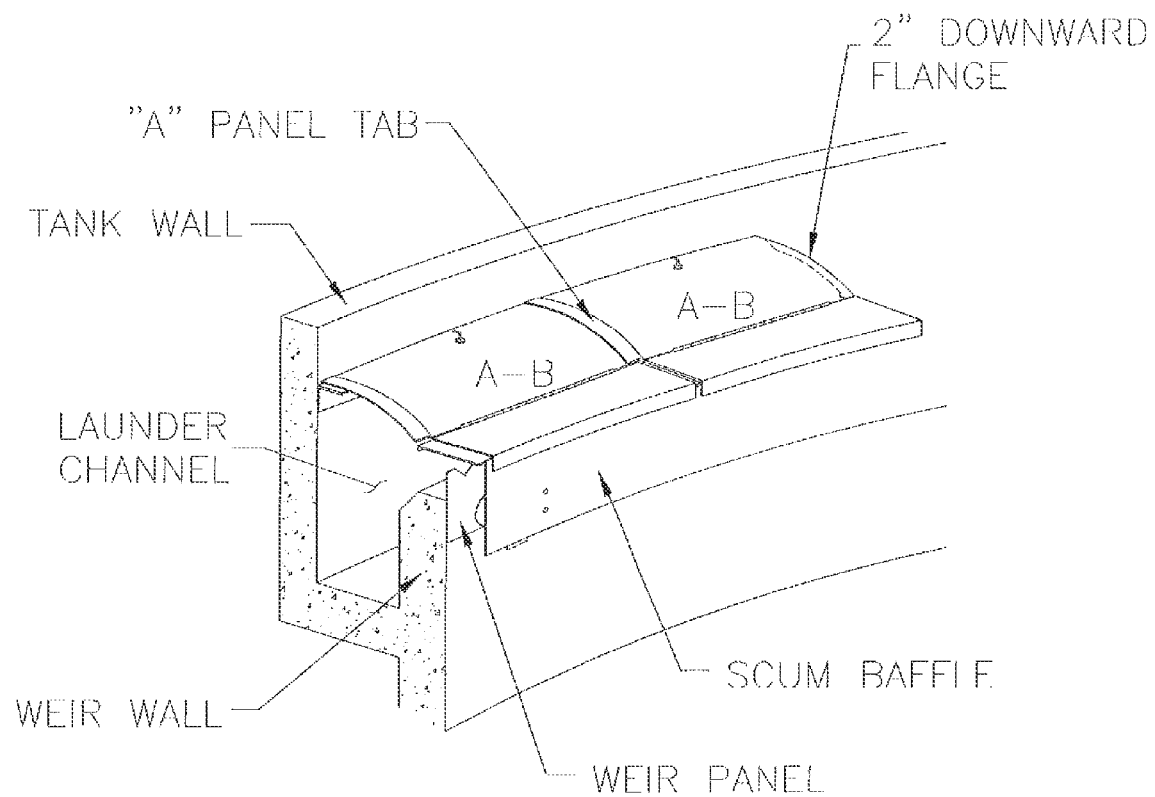
FIG. 5 is a prior art view showing the cover panels of FIG. 3 in the arrangement of FIG. 1 in an "A-B Zipper" arrangement.
Figure 6:
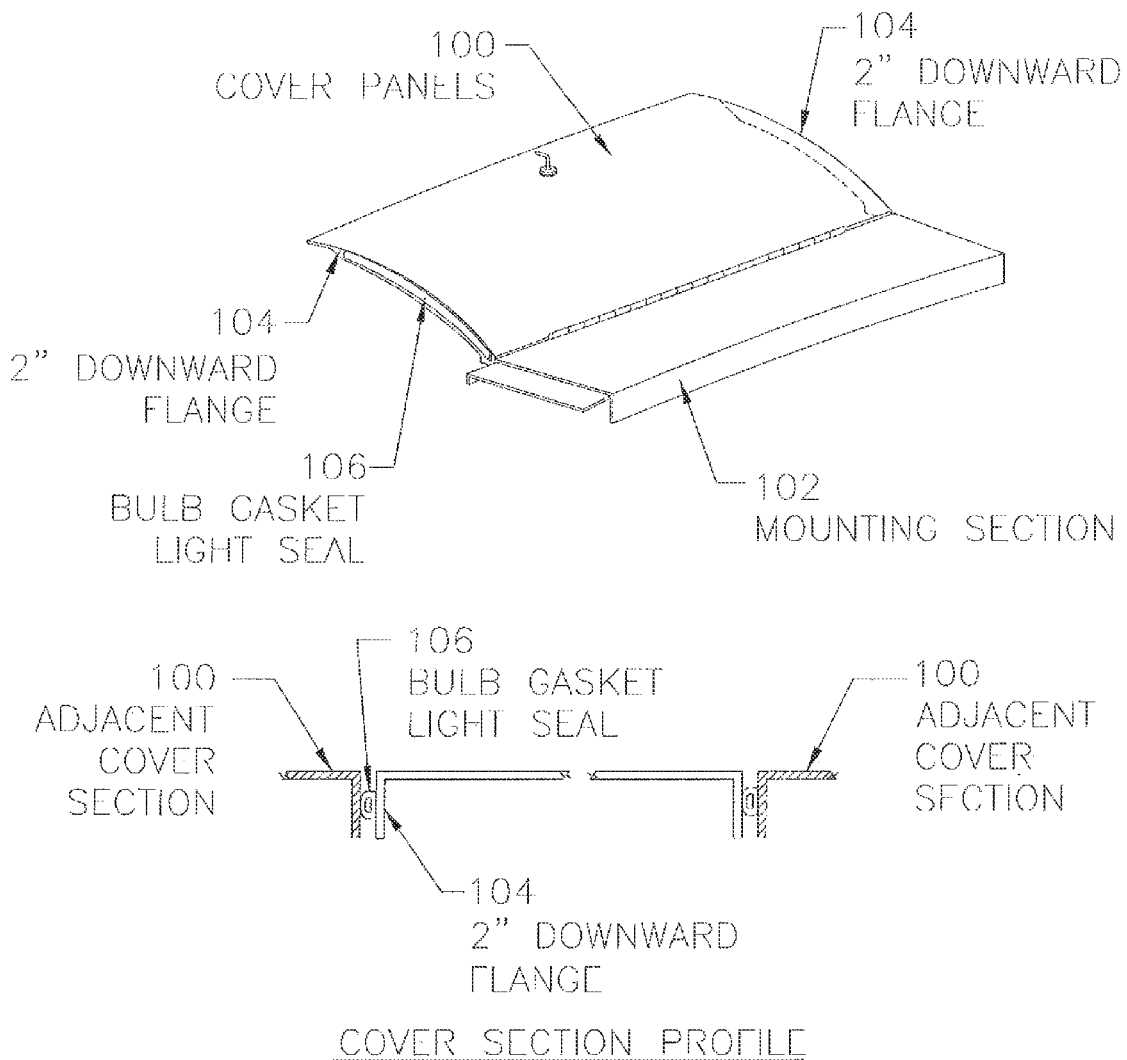
FIG. 6 is profile and side view of a cover panel according to one embodiment.

As illustrated in FIG. 6, a launder cover panel 100 according to the present arrangement typically includes a mounting section 102 that attaches to either the outer clarifier wall or the weir wall of the clarifier and serves as the base for the hinged cover panels. A single mounting 102 section can support three or more hinged cover panels 100, however, for the purposes of illustration mounting section 102 has a single panel member 100.

Each of the panel members 100 for a particular cover arrangement, such as that shown in FIG. 6, are substantially identical. For each panel member 100, there are no tabs added to the side edges of panel member 100 that would abut against adjacent panel members 100.

Rather, each panel member 100 has a stiffening flange 104 that is integrally molded or otherwise attached at each end/side of panel member 100 that follows the shape of the cover. As shown on the side profile portion of FIG. 6, stiffening flange 104 is typically constructed as a 90° downward (toward the tank) turned flange of approximately 2 inches in length.

In the present arrangement, a light seal, in the form of a soft rubber flap, a bulb gasket or other suitable device 106 is attached to one end of the panel along the length of the stiffening flange.

As shown in the lower portion of FIG. 6, individual cover panels 100 and the cover mounting section 102 are designed such that the width of the separation between closed cover panels 100 is predetermined to be approximately ½" to ⅝" wide between downwardly turned stiffening flanges 104 of any two adjacent cover panels 100. Light seal 106 is designed to fill this space and ensure that light does not reach the surface of the weir and launder below, thereby inhibiting the growth of algae. Light seal 106 is fabricated such that it provides a slight resistance/deformation in the closed arrangement (as shown for example in FIG. 6) to substantially close the gap between panel members 100 and simultaneously is resilient enough to allow for substantially free movement of panel members 100 relative to one another (and to survive several iterations of such openings without deterioration).

It is understood that certain modifications to the above described example may also fall within the scope of the invention. For example, in a situation where the panel to panel gap(s) are irregular or larger than normally desired (i.e. larger than ½" to ⅝" wide) it is possible to mount a light seal 106 on both stiffening flanges 104 on either side of one or more, or all, cover panels 100. In such an arrangement, rather than a light seal 106 abutting against an adjacent stiffening flange 104, it would instead abut against an adjacent light seal attached to that stiffening flange 104. This would allow larger or Irregularly shaped gaps, such as gaps of 1" or so, to be fully covered.

In the above example shown in FIG. 6, light seal 106 is configured as a bulb gasket, but it is understood that other shapes may be used such as a flap or other shaped gasket located at, on or near stiffening flanges 104 and dimensioned and constructed to act as a light seal when closed, be openable with a reasonable/nominal amount of resistance and then, when closed, return to a position/shape that again acts as a light seal.

Figure 7A:
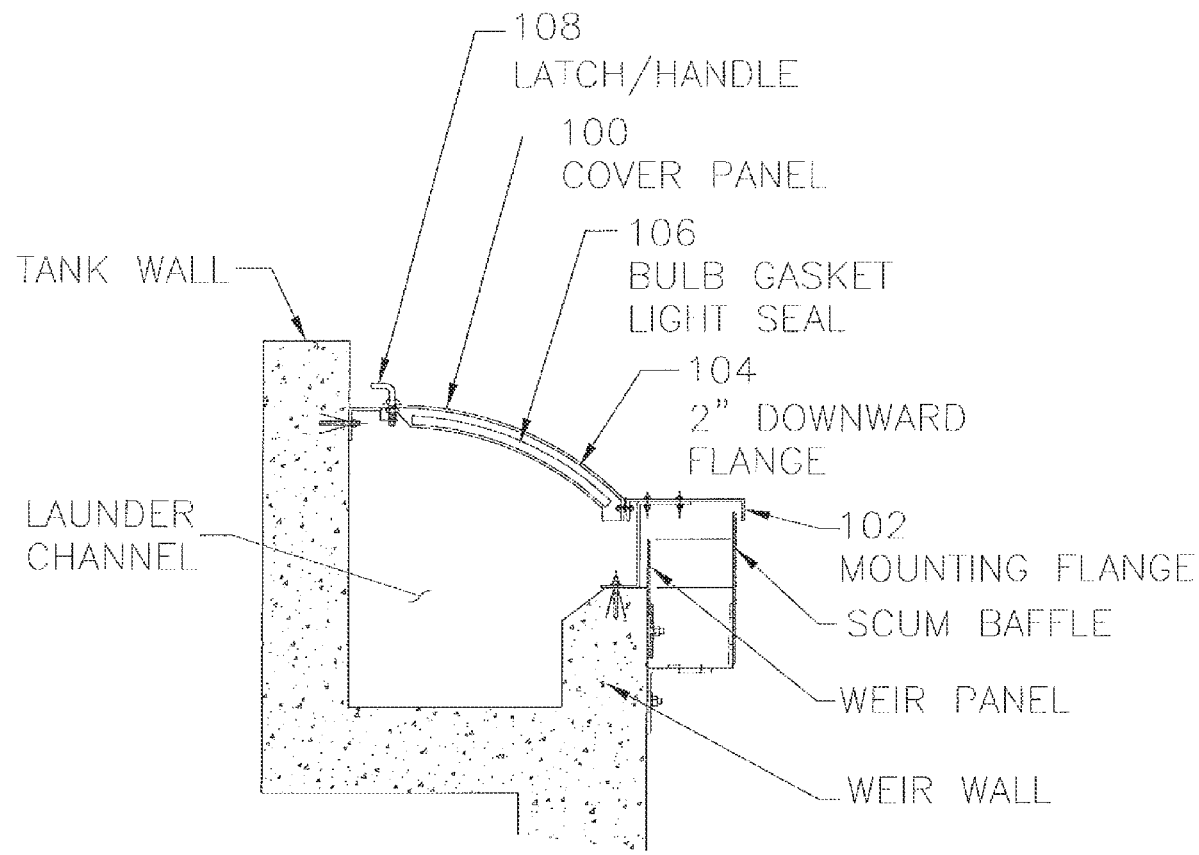
FIG. 7A is a side view of the cover panel of FIG. 6 arranged over a launder channel via weir mount according to one embodiment.

FIG. 7A shows the present arrangement using the panel member 100 in a "weir wall mounted" configuration, where mounting sections 102 are mounted over the weir wall of the launder channel and the cover opens toward the center of the tank.

Figure 7B:
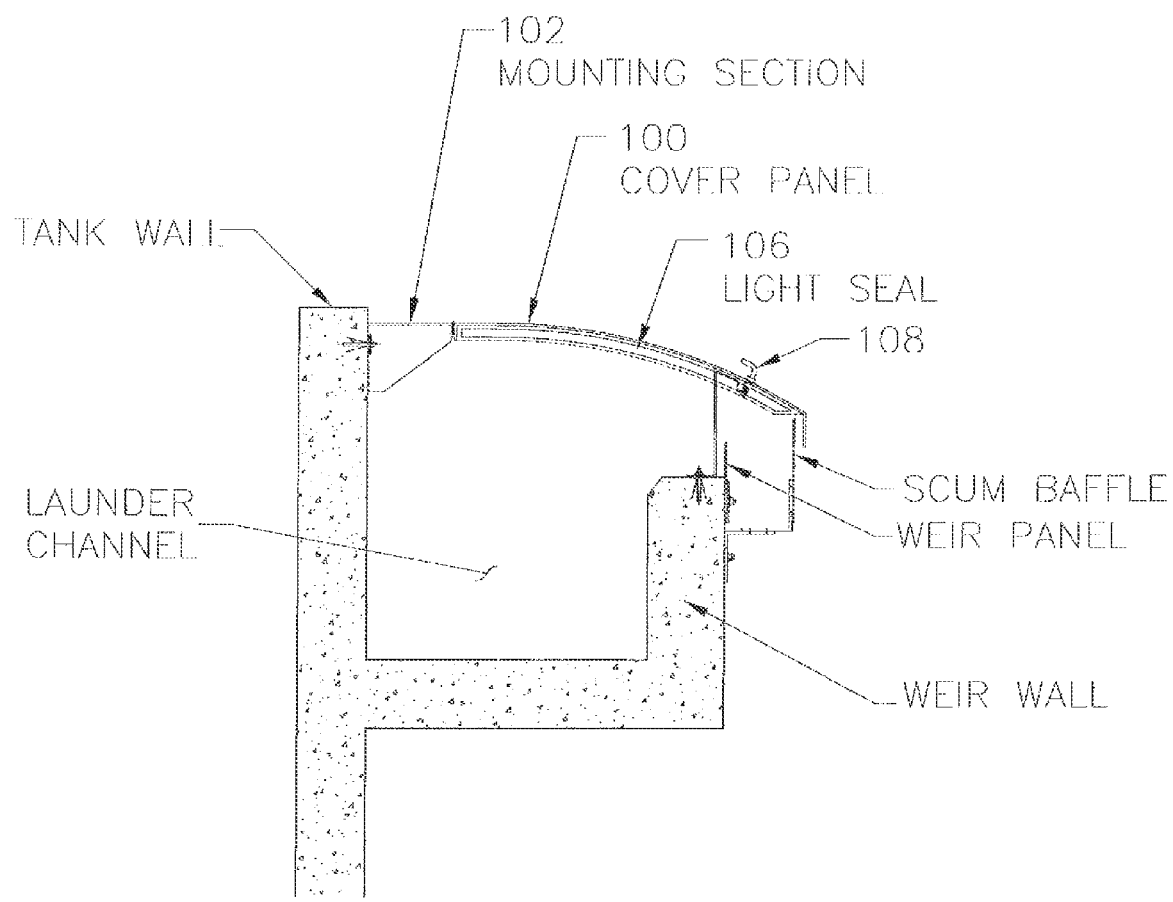
FIG. 7B is a side view of the cover panel of FIG. 6 arranged over a launder channel tank via wall mount according to one embodiment.

FIG. 7B illustrates an alternative arrangement in a "tank wall mounted" configuration, where mounting sections 102 are mounted to the outer wall of the launder channel and cover panel members 100 open toward the outer tank wall.

In both arrangements, every cover panel 100 is equipped with a latch/handle mechanism 108 that allows that individual cover section 100 to be locked for safety and security, and every cover panel 100 can be opened independent of any other section.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A cover arrangement for a launder channel of a clarifier tank, said clarifier tank having a tank wall, a launder channel and a weir wall, said cover arrangement comprising:
    at least one mounting section attachable to the clarifier tank near the launder channel; and
    a plurality of cover panel members, each panel member having a horizontal planar surface and two perpendicular stiffening flanges located on opposing lateral edges of said surface extending downwardly at a substantially 90 degree angle, said stiffening flanges of said cover panel members forming planar surfaces for facing opposing stiffening flanges on adjacent cover panel members in a substantially parallel manner, where each of said cover panel members further includes a light seal either one of attached to or attached near one of said stiffening flanges,
    wherein said cover arrangement includes arranging said plurality of cover panels around the clarifier tank over said launder channel such that said light seal attached to or near one of said planar surfaces facing opposing stiffening flanges of a said stiffening flange of a first panel member among said plurality of panel members abuts against a planar surfaces of a stiffening flange of an adjacent second panel member among said plurality of panel members.

2. The cover arrangement as claimed in claim 1, further comprising a plurality of mounting sections coupled to the clarifier tank near the launder channel.

3. The cover arrangement as claimed in claim 2, wherein said plurality of mounting sections are coupled to the clarifier tank on the tank wall near the launder channel.

4. The cover arrangement as claimed in claim 2, wherein said plurality of mounting sections are coupled to the clarifier tank on the weir wall near the launder channel.

5. The cover arrangement as claimed in claim 2, wherein each of said plurality of panel members is mounted each to its own one of said plurality' of mounting sections.

6. The cover arrangement as claimed in claim 1, wherein said stiffening flanges located on opposing lateral edges of said surface extend downward approximately 2".

7. The cover arrangement as claimed in claim 1, wherein said light seal is selected from the group consisting of a rubber bulb gasket, a rubber flap and a rubber, shaped gasket.

8. The cover arrangement as claimed in claim 1, wherein a plurality of adjacent cover panels entirely surround the launder channel of the clarifier tank.

9. The cover arrangement as claimed in claim 8, wherein, between each of said cover panels, there is a gap between a first edge of said first panel at one of its stiffening flanges, and a second edge of a second adjacent panel at one of its stiffening flanges.

10. The cover arrangement as claimed in claim 9, wherein said light seal on said first cover panels at said stiffening flange substantially seals said gap between said first edge of said first panel and said second edge of a second adjacent panel.

11. A cover arrangement for a launder channel of a clarifier tank, said clarifier tank having a tank wall, a launder channel and a weir wall, said cover arrangement comprising:

at least one mounting section attachable to the clarifier tank near the launder channel; and a plurality of cover panel members, each panel member having a horizontal planar surface and two perpendicular stiffening flanges located on opposing lateral edges of said surface extending downwardly at a substantially 90 degree angle, said stiffening flanges of said cover panel members forming a planar surfaces for facing opposing stiffening flanges on adjacent cover panel members in a substantially parallel manner, where each of said cover panel members further includes light seals, either one of attached to or attached near each of said stiffening flanges, wherein said cover arrangement includes arranging said plurality of cover panels around the clarifier tank over said launder channel such that said light seals attached to or near one of said planar surfaces facing opposing stiffening flanges of a said stiffening flanges of a first panel member among said plurality of panel members abuts against said light seals on said planar surfaces of stiffening flanges of an adjacent second panel member among said plurality of panel members.

* * * * *